(12) United States Patent
Dijon et al.

(10) Patent No.: US 7,880,375 B2
(45) Date of Patent: Feb. 1, 2011

(54) TRIODE CATHODE APPARATUS AND METHOD OF MAKING A TRIODE CATHODE APPARATUS

(75) Inventors: Jean Dijon, Champagnier (FR); Robert Meyer, St. Ismier (FR); Francois Levy, Claix (FR)

(73) Assignee: Commissariat A l'Energie Atomique, Paris (FR)

( * ) Notice: Subject to any disclaimer, the term of this patent is extended or adjusted under 35 U.S.C. 154(b) by 579 days.

(21) Appl. No.: 11/632,944

(22) PCT Filed: Oct. 26, 2004

(86) PCT No.: PCT/EP2004/052666

§ 371 (c)(1), (2), (4) Date: Jan. 19, 2007

(87) PCT Pub. No.: WO2006/010387

PCT Pub. Date: Feb. 2, 2006

(65) Prior Publication Data

US 2008/0084152 A1   Apr. 10, 2008

(30) Foreign Application Priority Data

Jul. 28, 2004   (FR) .................................. 04 51686

(51) Int. Cl.
  *H01J 63/02* (2006.01)
  *H01J 9/02* (2006.01)
  *H01J 63/04* (2006.01)
  *H01J 1/46* (2006.01)

(52) U.S. Cl. .......................... 313/495; 313/497; 445/24; 445/36; 445/46

(58) Field of Classification Search .................. 313/308, 313/309, 336, 351, 346 R, 495–497, 414; 445/24, 25, 29–31, 46–49
See application file for complete search history.

(56) References Cited

U.S. PATENT DOCUMENTS

| | | | |
|---|---|---|---|
| 5,256,936 A * | 10/1993 | Itoh et al. .................... 313/495 |
| 5,482,486 A * | 1/1996 | Vaudaine et al. ................ 445/3 |
| 6,062,931 A * | 5/2000 | Chuang et al. ................. 445/24 |
| 6,917,147 B2 | 7/2005 | Dijon et al. |
| 2002/0185964 A1 | 12/2002 | Russ et al. |
| 2003/0184357 A1 | 10/2003 | Dijon et al. |
| 2003/0193296 A1 | 10/2003 | Russ et al. |
| 2004/0090163 A1 | 5/2004 | Russ et al. |
| 2004/0145299 A1* | 7/2004 | Wang et al. .................. 313/497 |
| 2004/0256969 A1 | 12/2004 | Dijon et al. |

(Continued)

FOREIGN PATENT DOCUMENTS

FR   2 836 279   8/2003

(Continued)

*Primary Examiner*—Nimeshkumar D Patel
*Assistant Examiner*—Steven Horikoshi
(74) *Attorney, Agent, or Firm*—Oblon, Spivak, McClelland, Maier & Neustadt, L.L.P.

(57) ABSTRACT

A triode type cathode structure of an FED screen arranged in rows and columns, including a first lower metallization level forming cathodes, an electrical insulating layer, a second higher metallization level forming extraction grids, openings formed in the second metallization level and in the electrical insulating layer, and lines of electron emission arranged in the openings, which lines are parallel to the direction of the rows of the screen.

18 Claims, 5 Drawing Sheets

| U.S. PATENT DOCUMENTS | | | |
|---|---|---|---|
| 2006/0177602 A1 | 8/2006 | Dijon et al. | |
| 2007/0200478 A1 | 8/2007 | Dijon et al. | |
| 2007/0222357 A1 | 9/2007 | Dijon et al. | |

FOREIGN PATENT DOCUMENTS

| JP | 9-245689 | 9/1997 |
|---|---|---|
| WO | WO 94/15352 | 7/1994 |
| WO | WO 03/071571 A1 | 8/2003 |
| WO | WO 2007/003826 A2 | 1/2007 |
| WO | WO 2007/026086 A2 | 3/2007 |

* cited by examiner

TRIODE CATHODE APPARATUS AND METHOD OF MAKING A TRIODE CATHODE APPARATUS

TECHNICAL DOMAIN AND PRIOR ART

The invention relates to the domain of emissive cathodes and their application to the manufacture of screens.

It is particularly applicable to the manufacture of screens based on carbon nanotubes.

The resolution of a screen is an important element affecting the display quality of this screen and partly controls the type of applications for which the device can be used.

Moreover, at a given resolution, ease of manufacturing is an important element affecting the manufacturing cost.

FED screens based on carbon nanotubes use cathode structures with geometries with fairly large tolerances, which contributes to their low manufacturing cost.

FED screens are composed of rows and columns, the intersection of a row and a column defining a pixel. Data to be displayed are brought simultaneously onto the columns. Each row is scanned one after the other, to address the entire screen.

The structure of a triode type cathode 1, as described in document FR 2836279, is shown in FIGS. 1A and 1B. It comprises:
- a first metallisation level 4 forming the cathodes arranged in the direction of the columns in the screen. This first level (lower level) supports an optional resistive layer 2, for example made of silicon that improves the uniformity of the emission,
- an insulation 6 (for example silica) between the resistive layer and a second metallisation level 10.

This metallisation level 10 (high level) corresponds to the screen control grids that extract electrons. These grids are arranged in the direction of the screen columns.

Grid conductors 12, located at the same level as the grids 10, connect the grids to each other and to a main grid conductor 11 arranged in the direction of the rows on the screen. Similarly, cathode conductors 13 on the same level as the cathodes 4, connect the cathodes to each other (FIG. 1B).

Emission means, for example carbon nanotubes 14, are located on the resistive layer in a groove 16. This groove 16 is an opening made in the grids and the insulation layer 6.

Typically, the width of a groove 16 is about 15 µm, and the grids are arranged with a pitch of the order of 25 µm as indicated in FIG. 1A.

The grooves 16 are arranged in the direction of the columns on the screen, as illustrated in FIG. 1B, with the grids 10 and cathodes 4.

The divergence of the emitted electron beam defines the overlap δ with respect to the phosphorus area located on the anode (FIG. 2). The colour pitch P that defines the screen resolution is typically twice the overlap in the direction of the rows. This is the case particularly when colour phosphores are arranged in a strip parallel to the columns.

In the case of the structure described in FIGS. 1A and 1B, this overlap δ is typically of the order of 240 µm for an anode-cathode distance of 1 mm and an anode voltage of 3 kV, which leads to 1.4 mm colour pixels.

This type of resolution is compatible with large screens, but prevents use in high definition screens (1000 lines), for example with a 50 cm diagonal.

Therefore, the problem arises of finding a new screen structure capable of improving the resolution while maintaining an intrinsic simplicity of the cathode described in FIG. 1A.

PRESENTATION OF THE INVENTION

The invention relates firstly to a triode type cathode structure of an FED screen arranged or addressed in rows and columns, comprising a first lower level of metallisation forming cathodes, an electrical insulating layer, a second higher metallisation level forming extraction grids, openings formed in the second metallisation level and in the electrical insulating layer, lines of electron emission means arranged in these openings, said lines being parallel to the direction of the rows of the screen.

According to the invention, the structure is rotated by 90° compared with known structures, in other words the grooves in which the emission means are positioned are parallel to the direction of the lines.

The result is that the beam overlap is considerably improved.

The parallel rows or grids contribute to creating a divergent field structure in the direction perpendicular to the direction of the grids.

However, the electrical field component parallel to the rows forming grids is practically zero.

Therefore, the invention also relates to a triode type cathode structure of an FED screen arranged or addressed in rows and in columns, comprising a first lower metallisation level forming cathodes, an electrical insulating layer, a second higher metallisation level forming extraction grids, openings formed in the second metallisation level and in the electrical insulating layer, and row conductors, said openings being arranged parallel to the extraction grids and to the row conductors.

The openings may include one or several grooves parallel to the direction of the rows.

The rows and columns define pixels, the grids may be in the form of bands parallel to the direction of the rows on the screen and connected to each other, in each pixel, through at least one grid conductor.

The grids may also be connected by grid conductors, with each pair of adjacent conductors laterally delimiting a pixel.

The grids may also be connected by grid conductors, each of these grid conductors being located on the axis of symmetry of a pixel in the direction of the columns.

A grid conductor may pass between two adjacent electron emission means in the same line, for any pair of electron emission means in the same line.

Grids may also be connected by grid conductors, several connecting conductors being located in each pixel, in the direction of the columns.

Preferably, in this case pixels do not contain a lateral grid conductor, so that electrical disturbances due to these lateral conductors can be eliminated.

Electron emitters are preferably based on nanotubes or nanofibres made of carbon or silicon.

The invention further concerns a method for making a triode type cathode structure of an FED screen arranged in rows and columns, comprising:
- forming cathodes in a first lower metallisation level,
- forming an electrical insulating layer, and a second higher metallisation level,
- forming openings in said second metallisation level and in said electrical insulating layer,
- forming lines of electron emission means arranged in these openings, said lines being parallel to the direction of the rows of the screen.

Said method may further comprise forming a resistive layer, over said first metallization level.

Said openings can be etched in said second metallisation level and in said electrical insulating layer.

Catalyst pads can be deposited in said openings, said electron emission means being grown on said pads.

Said electron emission means can for example comprise nanotubes or nanofibres made of carbon or silicon, for example formed using a CVD process.

As a variant, said electron emission means can be added at the bottom of said openings.

DETAILED PRESENTATION OF PARTICULAR EMBODIMENTS

Figure 3:
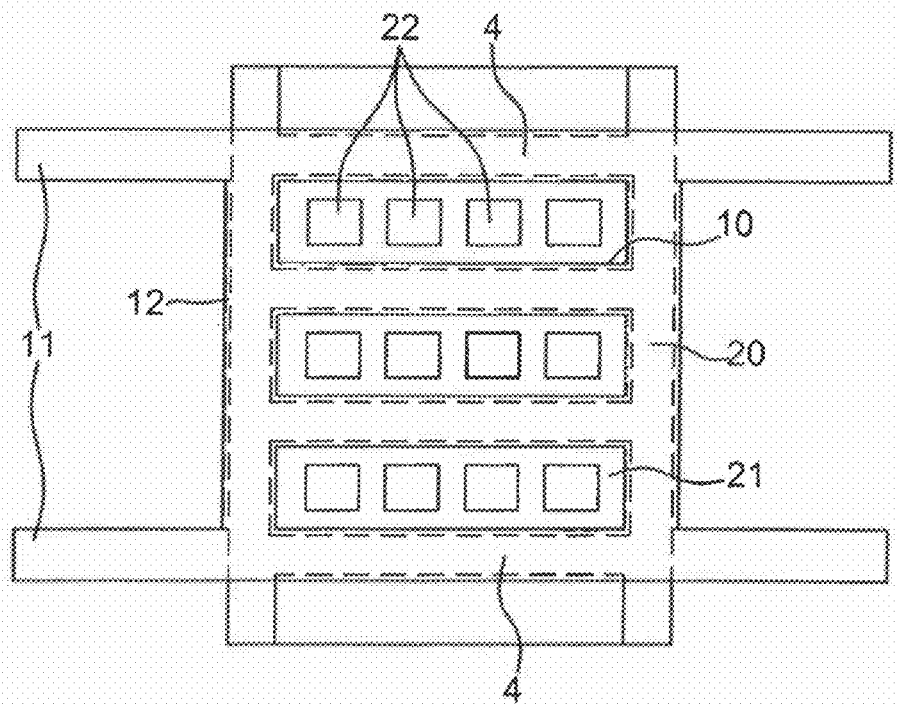
FIGS. 3, 4A, 4B, 5A and 5B show cathode structures according to the invention.

A first example embodiment of a structure according to the invention is illustrated in FIG. 3 that shows a pixel in an emitter device. It is a monochrome pixel, also called a subpixel of a colour pixel (a colour pixel comprises 3 monochrome pixels (1 for the red, 1 for the green and 1 for the blue)).

Figure 1A:
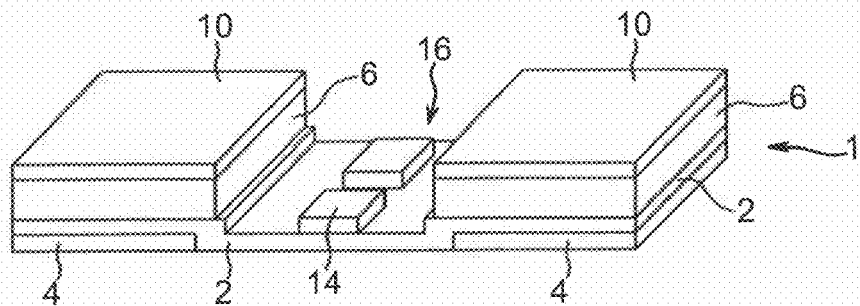
FIGS. 1A, 1B and 2 show a cathode structure according to prior art.

The basic elements of this structure (first metallisation level, resistive layer, insulation, etc.) are obtained in the same way as in the case of the structure in FIG. 1A.

In other words, a device according to the invention also comprises:
- a first metallisation level 4 that forms the screen cathodes (lower level);
- possibly a resistive layer 2 that improves the uniformity of the emission, is supported on the cathodes 4, for example this layer being made of silicon;
- insulation 6 between the resistive layer 2 and a second metallisation level 10, being used to make the control grids 10.

The assembly forms a triode structure, with the anode (not shown in FIG. 1A).

Figure 1B:
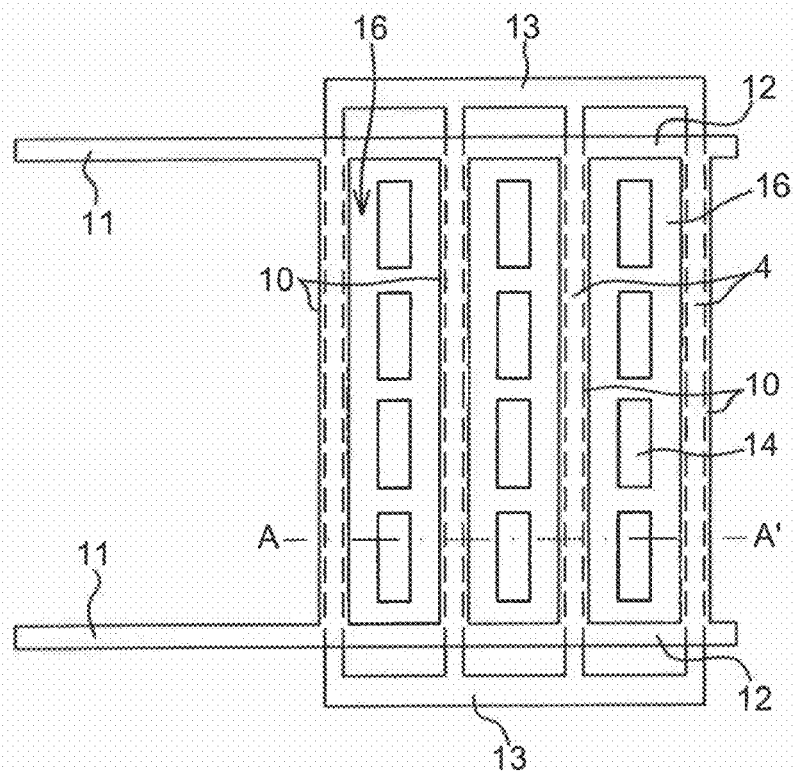
Figure 2:
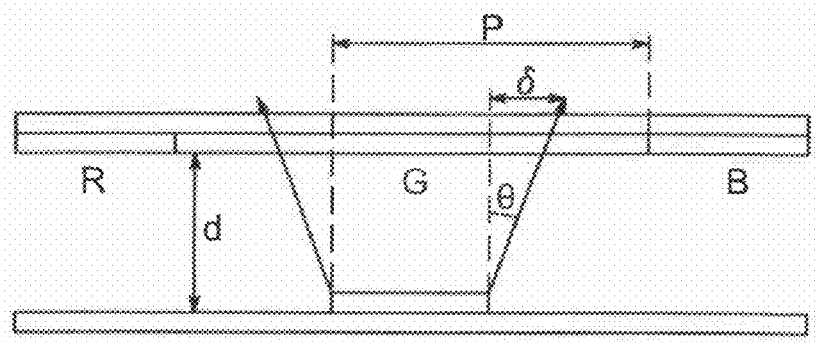

But unlike FIG. 1B, the grooves 21 in which the emission means are located, in this case the nanotubes, are arranged parallel to the direction of screen rows in the same way as the grids 10 and cathodes 4.

The grids 10 are connected to each other through grid conductors 12 (in this case arranged in the direction of the columns) and connected to the main conductors of grid 11 that remain in the direction of the rows. The cathodes are formed by the lower metallisation level (level 4 in FIG. 1A) and are connected to each other by cathode conductors 20, arranged in the direction of the columns.

In FIG. 3, the pixel shown comprises three grooves parallel to the main grid conductors 11 and separated by the grids 10.

More generally, a pixel may comprise n parallel grooves separated from each other by conductors arranged in row.

A groove 21 comprises catalyst pads or islands 22 of electron emitting elements, also arranged along the direction of the rows of the screen.

These emitting elements are electrically connected to cathodes 4 through the resistive layer 2 or possibly a metallic layer made over the entire surface of the substrate.

The grids 10 are arranged in the same direction as the grooves 21, parallel to the grid conductors.

The arrangement of the emitting elements or means in lines parallel to the rows considerably improves the overlap of the beam.

The grids 10, arranged parallel to the direction of the rows on the screen, contribute to creating a field structure divergent in the direction perpendicular to the direction of the grids (therefore perpendicular to the rows).

On the other hand, the electrical field component parallel to the grids (therefore parallel to the lines) is practically zero.

This component would be absolutely zero if the grids 10 were infinitely long, due to symmetry.

However, the emission means located at the ends of each of the grooves, will be subjected to a component of the divergent field, due to the grid conductors 12 connecting the grids.

This situation can be improved using pixel structures described in FIGS. 4A-5B.

Figure 4A:
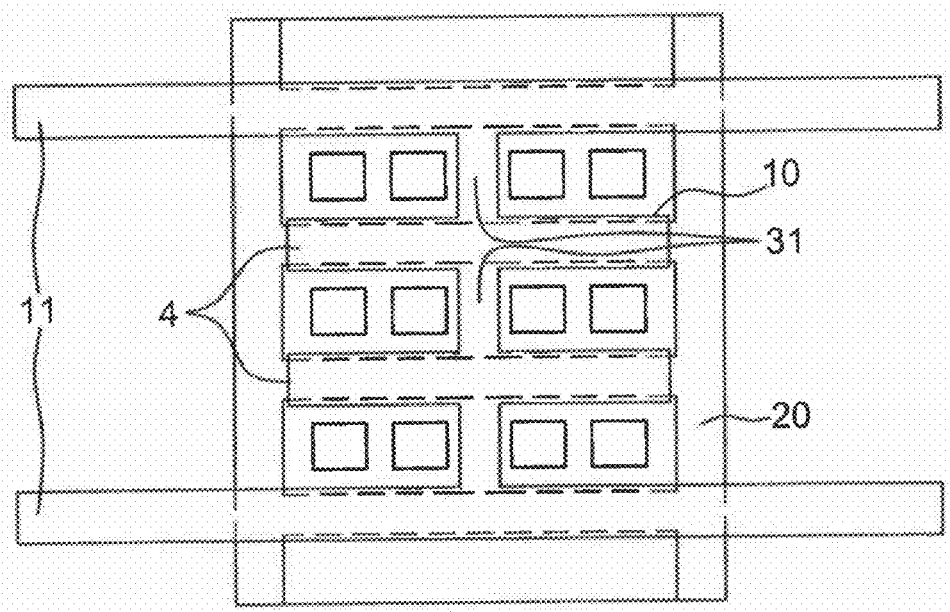
Figure 4B:
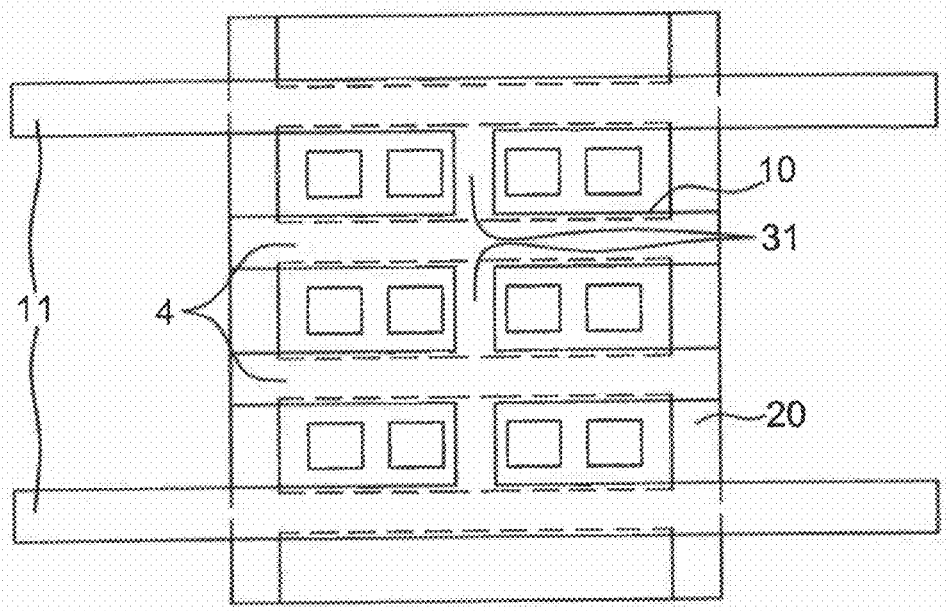
Figure 5A:
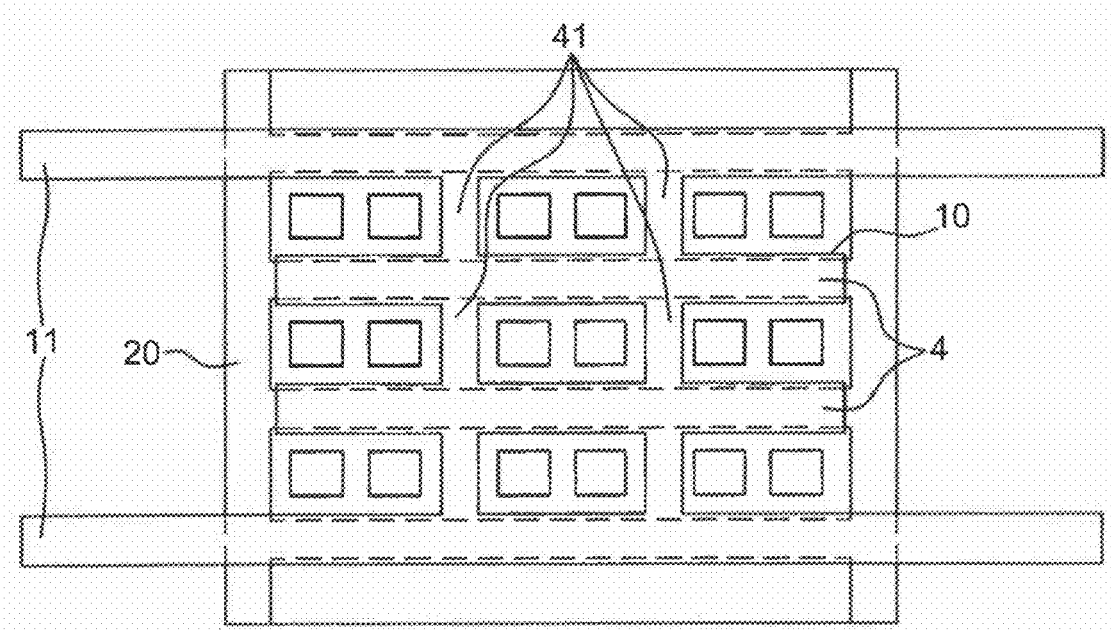
Figure 5B:
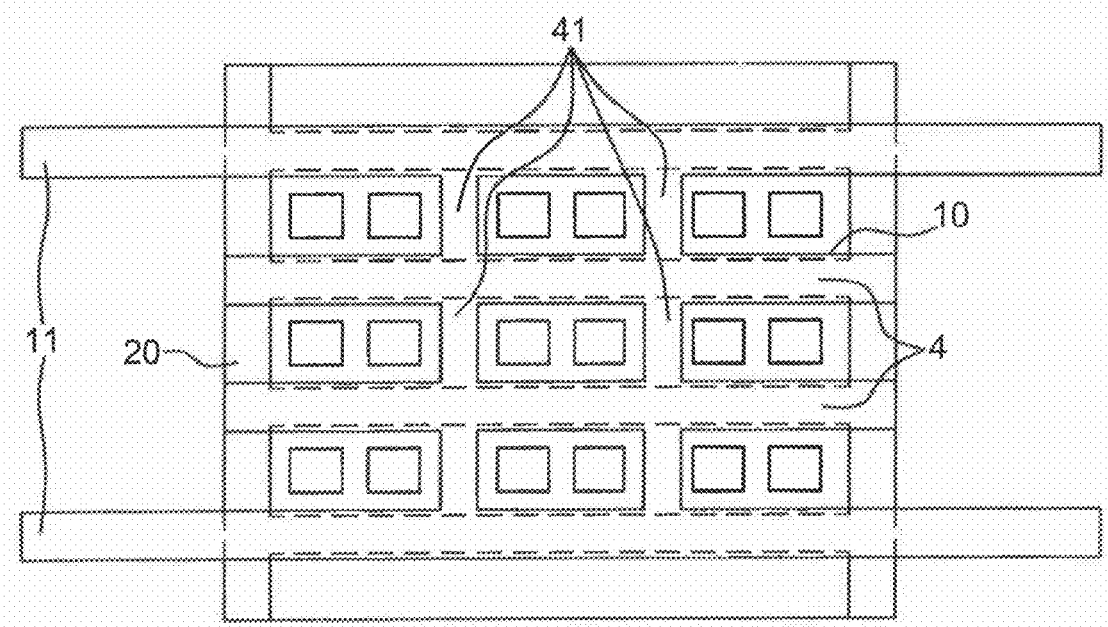

In the case of these figures, the lateral grid conductors 12 are eliminated and replaced by a central grid conductor 31 (FIGS. 4A, 4B) or several central grid conductors 41 (FIGS. 5A, 5B).

The grid conductors 10 stop at level of the location previously occupied by the lateral grid conductors 12, as illustrated in FIGS. 4A and 5A, or are prolonged above the location previously occupied by the lateral grid conductors 12 (FIGS. 4B and 5B).

Thus, the lateral grid conductors 12 can be eliminated for each pixel, thus also eliminating electrical disturbances caused by these lateral conductors.

Divergence phenomena caused by the central grid conductors 31, 41 are less disturbing because they produce their effects within a single pixel (unlike the lateral grid conductors 12 in FIG. 3, that can cause disturbances on adjacent pixels).

Furthermore, cathode conductors 20, at 0 V and located at the edge of the pixel, focus electrons towards the inside of the pixel. Therefore these configurations in FIGS. 4A, 4B and 5A, 5B are more favourable than the configuration in FIG. 3.

The variant in FIGS. 5A and 5B, with several central grid conductors 41, are tolerant to cut-off problems of the central conductor 31 in FIGS. 4A and 4B, due to the redundancy provided by the two central conductors 41.

In these embodiments, a pixel comprises n parallel grooves separated from each other by grids arranged in the direction of the rows on the screen, each line also being separated in two (FIGS. 4A, 4B) or more than two (FIGS. 5A, 5B) segments or sectors by grid conductors 31, 41 connecting the said grids and arranged in the direction of the screen columns. It is even possible to have a grid conductor passing between two pads or islands of adjacent emitter elements in the same line or groove, and possibly for each line or groove.

Figure 6A:
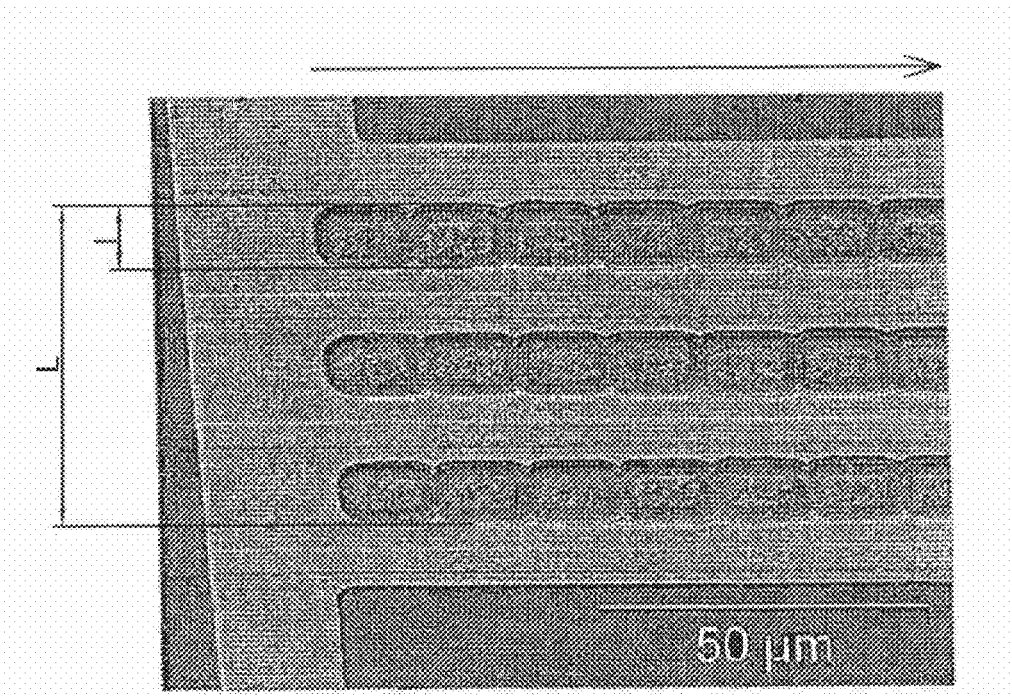
FIGS. 6A and 6B show structures according to prior art and according to the invention respectively.

FIG. 6A shows a structure of a sub-pixel according to prior art, comprising four rows of grids and three lines of nanotubes arranged between these grids. The direction of the columns is represented by the arrow in the top part of the figure.

The size of the pads is 5 μm by 10 μm, the width I of the groove is 15 μm and the total width of the sub-pixel is L=72 μm.

With this structure, a lateral overlap 8 in the direction of the rows equal to 240 μm was measured for an anode-cathode distance of 1 mm and an anode voltage of 3 kV.

Figure 6B:
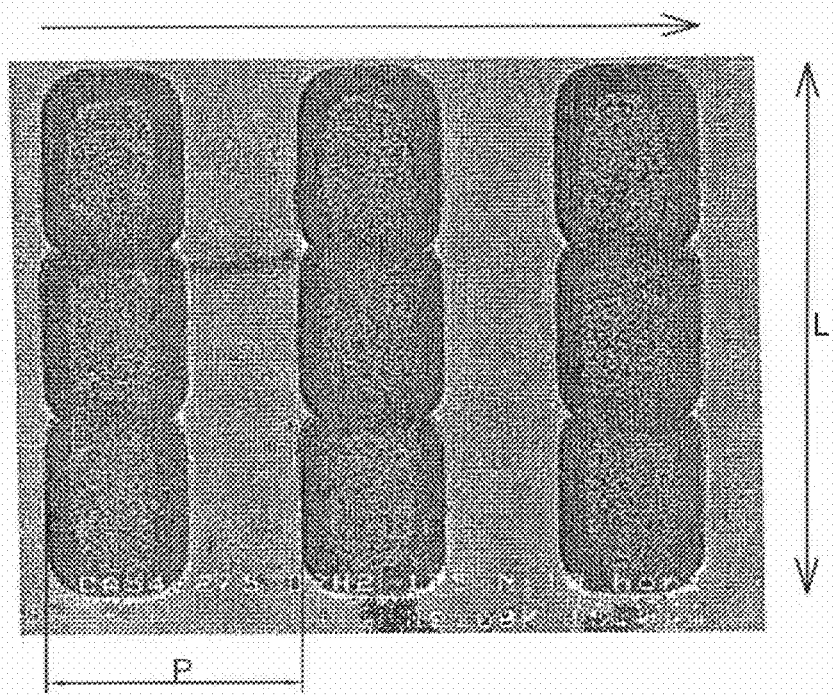

FIG. 6B shows a portion of a structure according to the invention: nanotube grooves were turned over and are arranged perpendicular to the direction of the screen columns, namely in the direction of the screen rows.

The sub-pixel comprises twelve parallel grooves (not all shown) arranged at a pitch of 24 μm (this is the pitch P shown in the figure), each groove comprising three pads of 5 μm by 10 μm nanotubes.

Under these conditions, with 3 kV on the anode and with an anode-cathode distance of 1 mm, the lateral overlap in the direction of the columns drops to only 150 μm.

Regardless of the embodiment used, a device according to the invention may be made using vacuum deposition and photolithography techniques.

For example, a cathode conductor may be obtained by deposition of a conducting material, for example molybdenum, chromium, niobium, or TiW, etc. This material may then be etched along a band to form cathodes arranged along the direction of the rows on the screen, and the conducting elements that connect them.

Deposits can then be made, for example a deposit of a resistive layer, for example made of silicon, and a deposit of an insulating layer, for example made of silica, and finally a metallic layer that will form electrons extraction grids.

The metallic layer and the insulating layer are then etched to form trenches or grooves that will be arranged along the direction of the rows of the screen, like the extraction grids.

Catalyst pads adapted to growth of the electron emitting material (Ni, or Co, or Fe, or Mo, or Pt, or an alloy of these materials for the growth of nanotubes) may be deposited at the bottom of the grooves by "lift-off". This catalyst may be arranged on a barrier layer, for example made of TiN.

If carbon nanotubes are used, they can be made using a thermal chemical vapour deposition (CVD) process, for example using acetylene at a pressure of the order of 150 mTorr.

As a variant, the nanotubes or more generally the electron emitter devices, may also be added at the bottom of the grooves.

One device according to the invention also concerns a screen, particularly an FED type screen, comprising a high-resolution cathode device or structure like that described above according to the invention. Such a screen has for example a 50 cm diagonal.

The invention claimed is:

1. A triode cathode apparatus of a field effect display screen, said display screen including a plurality of pixels arranged in a matrix of rows and columns, said triode cathode apparatus comprising, per pixel:
    a first lower metallization level forming a cathode, said cathode being in a direction parallel to a longest length of one of the columns;
    an electrical insulating layer;
    a second higher metallization level including extraction grids in a form of bands parallel to a longest length of one of the rows of the field effect display screen, said extraction grids connected to each other through plural central grid conductors;
    plural grooves having a major dimension parallel to the longest length of one of the rows of the field effect display screen and formed in the second metallization level and in the electrical insulating layer; and
    an electron emission device disposed on lines of pads arranged in each groove parallel to the longest length of one of the rows of the field effect display screen, the electron emission device including electron emitters based on nanotubes or nanofibers made of carbon or silicon,
    wherein at least one pixel of the field effect display screen does not contain a lateral grid conductor connecting the bands to each other.

2. The triode cathode apparatus according to claim 1, further comprising:
    a resistive layer inserted between the first metallization level and the lines of the electron emission device.

3. The triode cathode apparatus according to claim 1, wherein one of the plural central grid conductors is located on an axis of symmetry of the pixel.

4. The triode cathode apparatus according to claim 1, wherein at least one of the plural central grid conductors passes between two adjacent pads of electron emitter elements in a same groove.

5. The triode cathode apparatus according to claim 1, wherein a respective one of the plural central grid conductors passes between two adjacent pads of electron emitter elements.

6. A display apparatus, comprising:
    a field effect display screen including a plurality of pixels arranged in matrix of rows and columns, said field effect display screen including the triode cathode apparatus according to claim 1.

7. The triode cathode apparatus according to claim 1, wherein the plural grooves are separated by extraction grids.

8. A method for making a triode cathode apparatus of a field effect display screen, said display screen including a plurality of pixels arranged in a matrix of rows and columns, said method comprising:
    forming cathodes in a first lower metallization level, said cathode being in a direction parallel to a longest length of one of the columns;
    forming an electrical insulating layer;
    forming a second higher metallization level including extraction grids formed in bands parallel to a longest length of one of the rows of the screen and connected to each other through plural central grid conductors located in each pixel;
    forming plural grooves having a major dimension parallel to the longest length of one of the rows of the field effect display screen and formed in the second metallization level and in the electrical insulating layer; and
    disposing an electron emission device on lines of pads arranged in each groove parallel to the longest length of one the rows of the field effect display screen, the electron emission device including electron emitters based on nanotubes or nanofibers made of carbon or silicon,
    wherein at least one pixel of the field effect display screen does not contain a lateral grid conductor connecting the bands to each other.

9. The method according to claim 8, further comprising:
    forming a resistive layer over the first metallization level.

10. The method according to claim 8, further comprising:
    etching the second metallization level and the electrical insulating layer.

11. The method according to claim 8, further comprising:
    disposing catalyst pads in openings in the second metallization level; and
    growing lines of the electron emission device on the catalyst pads.

12. The method according to claim 8, further comprising:
    forming the nanotubes or nanofibres using a chemical vapor deposition process.

13. The method according to claim 11, wherein the growing includes growing the lines of the electron emission device at a bottom of the grooves in the second metallization level.

14. The method according to claim 8, wherein the forming the second higher metallization includes forming the grids connected by the at least one central grid conductor, such that the at least one central grid conductor is located on an axis of symmetry of a pixel.

15. The method according to claim 8, wherein the central grid conductors pass between two adjacent lines of the electron emission device in the same line.

16. The method according to claim 15, wherein the forming the second higher metallization includes forming a central grid conductor that passes between two adjacent pads of electron emitter elements.

17. A method comprising:
forming a field effect display screen; and
forming the triode cathode apparatus according to claim 8.

18. The method according to claim 8, wherein the forming plural grooves includes separating said plural grooves by extraction grids.

* * * * *